United States Patent [19]

Gupta

[11] Patent Number: 4,826,891

[45] Date of Patent: * May 2, 1989

[54] RADIATION CURABLE COPOLYMERS OF P-ACETOXYSTYRENE WITH ALLYL ESTERS OF ETHYLENICALLY UNSATURATED ACIDS OR ALKADIENES

[75] Inventor: Balaram Gupta, North Plainfield, N.J.

[73] Assignee: Hoechst Celanese Corporation, Somerville, N.J.

[*] Notice: The portion of the term of this patent subsequent to Oct. 4, 2005 has been disclaimed.

[21] Appl. No.: 59,348

[22] Filed: Jun. 8, 1987

[51] Int. Cl.$^4$ .................... C08F 2/50; C08F 255/08; C08F 18/12; C08F 22/28
[52] U.S. Cl. .................... 522/114; 522/116; 522/121; 522/153; 525/283; 525/303; 525/305; 525/306; 525/307
[58] Field of Search ............. 435/142; 522/100, 121, 522/116, 120, 110, 114; 525/66, 455, 529, 530, 143, 374, 110, 289, 302, 304, 283, 303, 305, 306, 307; 526/301, 313

[56] References Cited

U.S. PATENT DOCUMENTS

| | | | |
|---|---|---|---|
| 4,129,617 | 12/1978 | Machi et al. | 522/120 |
| 4,133,731 | 1/1979 | Hansen et al. | 522/110 |
| 4,137,137 | 1/1979 | Machi et al. | 522/120 |
| 4,556,464 | 12/1985 | St. Clair | 522/110 |

FOREIGN PATENT DOCUMENTS

| | | | |
|---|---|---|---|
| 0187044 | 7/1986 | European Pat. Off. | 522/121 |
| 0187045 | 7/1986 | European Pat. Off. | 522/121 |

OTHER PUBLICATIONS

Gupta Copolymers of P-Acetoxystyrene with any of certain polyunsaturated compound.

*Primary Examiner*—John C. Bleutge
*Assistant Examiner*—Arthur H. Koeckert
*Attorney, Agent, or Firm*—Lynch, Cox, Gilman & Mahan

[57] ABSTRACT

Radiation curable compositions useful as coatings for wood, metal, glass, fabric paper, fiber and plastics are made from copolymers of p-acetoxystyrene and another monomer which is an alkadiene or an allyl ester of a polymerizable ethylenically unsaturated acid blended with ethylenically unsaturated compounds.

11 Claims, No Drawings

RADIATION CURABLE COPOLYMERS OF P-ACETOXYSTYRENE WITH ALLYL ESTERS OF ETHYLENICALLY UNSATURATED ACIDS OR ALKADIENES

BACKGROUND OF INVENTION

The field of art to which this invention pertains is radiation curable compositions.

Due to environmental concerns and the high cost of solvents, commercial interest in radiation curable compositions is constantly increasing. Legislation which restricts the amount of solvent and other pollutants that can be vented to the atmosphere is one reason for this increased interest. Other reasons are the concerns expressed by unions and individuals over the possible toxic effects of prolonged exposure to volatile organic materials and also the high cost of petroleum derived solvents. Generally, radiation curable systems are essentially 100 percent reactive systems, i.e., substantially all of the components react to produce the final product. Such systems can be cured by exposure to high energy ionizing radiation or to actinic radiation in the presence of photoinitiators.

Various types of ethylenically unsaturated compounds have been used in making radiation curable compositions. Examples of such compounds include acrylated epoxies, such as those described in U.S. Pat. Nos. 3,676,398, 3,770,602, 4,072,592 and 4,511,732. Acrylated urethanes, such as those describe in U.S. Pat. Nos. 3,700,643 and 4,511,732, have also been used in radiation curable compositions. Norbornene polymers, such as those described in U.S. Pat. No. 3,554,886, are examples of other types of radiation curable compositions. Constant efforts are being made to find other compositions which can be used in radiation curing.

SUMMARY OF INVENTION

This invention pertains to radiation curable compositions based on copolymers of para-acetoxystyrene and alkadiene monomers or allyl esters of ethylenically unsaturated acids.

The radiation curable compositions of this invention are made from a blend of: (A) about 30 to about 80 weight percent of a copolymer of p-acetoxystyrene and an alkadiene monomer or an allyl ester of an ethylenically unsaturated acid; (B) about 20 to about 70 weight percent of a polyethylenically unsaturated radiation polymerizable compound; and, optionally, (C) about 0 to about 40 weight percent of a monoethylenically unsaturated radiation polymerizable monomer, wherein said weight percents are based on the total weight of (A), (B) and (C).

The compositions of this invention are utilized as coating compositions and can be cured by high energy electrons or by ultraviolet light if a photoinitiator is added.

DESCRIPTION OF INVENTION

The copolymers of this invention are described in copending, commony assigned patent application Ser. No. 29,108, filed Mar. 23, 1987, now U.S. Pat. No. 4,775,730.

The p-acetoxystyrene component of the copolymers used in this invention can be made by the process described in Corson et al., *Journal of Organic Chemistry* 23, 544–549 (1958). As described in this article, phenol is acetylated to p-hydroxyacetophenone which is then acetylated to p-acetoxyacetophenone. This compound is then hydrogenated to p-acetoxyphenylmethylcarbanol, which is then dehydrated to p-acetoxystyrene.

The alkadiene monomers useful in this invention are those monomers which contain two conjugated ethylenically unsaturated groups and which polymerize through 1,2 or 1,4 addition leaving one unsaturated group unpolymerized. Examples of such monomers are 1,3-butadiene, 1,3-pentadiene 1,3-hexadiene, 2,4-hexadiene, 2,5-dimethyl-2,4-hexadiene, isoprene, chloroprene and alkyl esters of sorbic acid wherein the alkyl group contains from 1 to 6 carbon atoms.

The allyl ester monomers useful in this invention are mono and diallyl esters of, respectively, mono and dicarboxylic acids which contain one polymerizable ethylenically unsaturated group. Examples of such esters include allyl acrylate, allyl methacrylate, allyl ethacrylate, diallyl maleate, diallyl fumarate, diallyl itaconate, allyl sorbate and diallyl muconate.

In preparing copolymers with the alkadiene monomers, polymerization takes place either 1,2 or 1,4 leaving an unsaturated group which is polymerizable by radiation. The allyl ester monomers polymerize through the ethylenic unsaturation in the acid portion of the monomer leaving the allyl unsaturation intact. Polymers formed from the diene monomers and from the allyl monomers can be crosslinked by radiation.

The copolymers used in this invention are prepared by the free radical polymerization of p-acetoxystyrene and the other monomer, in solution, emulsion, or suspension using well known polymerization techniques. The copolymers will contain about 10 to about 90 weight percent p-acetoxystyrene and about 10 to about 90 weight percent of the other monomer. The preferred copolymers are those made from allyl maleate and p-acetoxystyrene using about 30 to about 70 weight percent diallyl maleate and about 30 to about 70 weight percent p-acetoxystyrene.

The polyethylenically unsaturated radiation polymerizable compounds which are blended with the copolymers described hereinabove are compounds which contain two or more ethylenically unsaturated groups and, preferably, two to about six ethylenic groups. The ethylenically unsaturated groups are acrylate and methacrylate groups, vinyl groups and allyl groups. Compounds which contain the acrylate or methacrylate groups are acrylic or methacrylic acid esters of polyols wherein the polyols have two or more hydroxyl groups per molecule. Examples of such compounds are the diacrylic or dimethacrylic acid esters of ethylene glycol, propylene glycol, butanediol, butenediol, hexanediol, polyoxyethylene glycols, polyoxypropylene glycols, polyoxybutylene glycols, di- and triacrylic or methacrylic acid esters of glycerine and hexanetriol, trimethylolpropane, trimethylolethane, di, tri and tetra acrylic acid or methacrylic acid esters of pentaerythritol, the di, tri, tetra, penta and hexa acrylic or methacrylic acid esters of dipentaerythritol and the like. Other polyacrylates or methacrylates are the acrylated and methacrylated epoxy compounds such as the acrylated or methacrylated glycidyl ethers of dihydric phenols, acrylated and methacrylated epoxidized vegetable oils, acrylated and methacrylated urethanes and acrylated and methacrylated polyesters.

Examples of polyvinyl and polyallyl compounds are divinylbenzene, divinyltoluene, diallylbenzene, diallyltoluene, diallyl terephthalate, diallylmaleate, diallylfumarate and the like.

Monoethylenically unsaturated radiation polymerizable monomers which can be used in this invention are the well known monomeric compounds which contain one ethylenically unsaturated group per molecule. Examples of such monomers are alkyl acrylates and methacrylates wherein the alkyl group contains from 1 to 12 carbon atoms, mono and polyalkoxyalkylacrylates and methacrylates wherein the alkoxy groups and alkyl groups contain from 1 to 4 carbon atoms and wherein the molecules contain from 1 up to 20 alkoxy groups, hydroxyalkyl acrylates and methacrylates wherein the alkyl group contains from 1 to 6 carbon atoms, vinyl aromatic compounds, vinyl halides, vinyl pyrrolidone, vinyl pyridine, vinyl carbazole and the like.

The radiation curable compositions of this invention can be cured by any of the normal actinic radiation curing methods. The radiation can be ionizing radiation (either particulate or nonparticulate) or non-ionizing agents. As a suitable source of particulate radiation, one can use any source which emits electrons or charged nuclei. Particulate radiation can be generated by electron accelerators, such as the Vander Graff accelerator, resinous transformers, linear accelerators, insulating core transformers, radioactive elements, such as cobalt 60, strontium 90, and the like. As a suitable source of nonparticulate non-ionizing radiation, any source which admits radiation in the range of from $10^{-3}$ angstroms to 2000 angstroms can be used. Suitable sources included vacuum ultraviolet lamps, such as xenon or krypton arcs. As a suitable source of non-ionizing radiation, any source which admits radiation from 2000 angstroms to 4000 angstroms can be used. Suitable sources include mercury arcs, carbon arcs, tungsten filament lamps, sun lamps and lasers. All of these devices and sources are well known in the art and those skilled in radiation technology are fully aware of the manner in which radiation is generated and the precautions to be taken in its use.

When the radiation curable coating compositions are to be cured by exposure to non-ionizing radiation, e.g., ultraviolet radiation, photoinitiators may be added to the compositions. Suitable photoinitiators which are well known in the art include 2,2-diethoxy-acetophenone, 2, 3 or 4-bromoacetophenone, benzaldehyde, benzoin, benzophenone, 9,10-dibrooanthracene, 4,4'-dichlorobenzophenone, 2,3-pentanedione, hydroxycyclohexylphenyl ketone and xanthone. Such photoinitiators are generally added in amounts of from about 0.1 weight percent up to 10 weight percent based on the weweight of the total curable composition and, preferably, 1 to 5 weight percent.

Photoactivators can also be used in combination with the photoinitiators. Examples of photoactivators are methylamine, tributylamine, 2-aminoethylethanolamine, cyclohexylamine, diphenylamine and tribenzylamine.

The radiation curable compositions of this invention are preferably used as coating compositions. The coatings can be applie by conventional means, including spraying, curtain coating, dip padding, roll coating and brushing procedures. The coatings can be applied to any acceptable substrate such as wood, metal, glass, fabric, paper, fiber, plastics, etc.

The compositions of this invention are made by blending the copolymers of p-acetoxystyrene and the alkadiene or allyl ester monomers with the polyethylenically unsaturated compounds. In order to adjust the viscosity for proper application, monoethylenically unsaturated monomers can be added. Additional additives which can be used in the compositions include wetting agents, fillers, defoamers, dyes and pigments, the uses of which are well known in the art.

The following examples illustrate the invention in more detail. Parts and percentages unless otherwise designated are parts and percentages by weight.

EXAMPLE 1

In a suitable reactor are mixed 10 parts of a copolymer of 2 parts of diallyl maleate and 8 parts of p-acetoxystyrene, 13 parts of 1,6-hexanediol diacrylate, 14.5 parts of ethyl acrylate and 2 parts of Darocur 1173, a photoinitiator obtained from Merck & Company. Coatings are drawn down on polyester sheet and glass using a two mil wire wound rod. The coatings are cured at a line speed of 20–50 ft. per minute with a RPC Ultraviolet Curing Unit, Model QC-1202 Radiation Polymer Company, Plainfield, Ill. with one 300 watt per linear inch mercury vapor lamp without an infrared filter. Excellently cured coatings are obtained.

EXAMPLE 2

A blend is made from 40 parts of a copolymer of 20 parts of p-acetoxystyrene and 20 parts of 2,5-dimethyl-2,4-hexadiene, 35 parts of trimethylolpropane triacrylate, 5 parts of ethoxyethoxyacrylate, 20 parts of N-vinyl pyrrolidone and 2 parts of hydroxycyclohexylphenyl ketone. Coatings are drawn down on filled particle board at 0.5 mil thickness and are cured using the procedure described in Example 1. Excellently cured coatings are obtained.

The principles, preferred embodiments and modes of operation of the present invention have been described in the foregoing specification. The invention which is intended to be protected herein, however, is not to be construed as limited to the particular forms disclosed, since these are to be regarded as illustrating rather than restrictive. Variations and changes may be made by those skilled in the art without departing from the spirit of the invention.

What is claimed:

1. A radiation curable composition comprising a blend of
   (A) about 30 to about 80 weight percent of a copolymer of p-acetoxystyrene and another monomer which is an alkadiene or an allyl ester of a polymerizable ethylenically unsaturated acid;
   (B) about 20 to about 70 weight percent of a polyethylenically unsaturated radiation polymerizable compound different from (A);
   (C) about 0 to about 40 weight percent of a monoethylenically unsaturated radiation polymerizable monomer, wherein the weight percents are based on the total weight of (A), (B) and (C), wherein the copolymer contains about 10 to about 90 weight percent p-acetoxystyrene and about 90 to about 10 weight percent other monomer.

2. The radiation curable composition of claim 1 wherein the copolymer contains about 30 to about 70 weight percent p-acetoxystyrene.

3. The radiation curable composition of claim 1 wherein the other monomer is an alkadiene which contains 2 conjugated ethylenically unsaturated groups.

4. The radiation curable composition of claim 3 wherein the alkadiene is 2,5-dimethyl-2,4-hexadiene.

5. The radiation curable composition of claim 1 wherein the other monomer is a diallyl ester of a dicarboxylic acid which contains one polymerizable ethylenically unsaturated group.

6. The radiation curable composition of claim 5 wherein the other monomer is diallyl maleate.

7. The radiation curable composition of claim 1 wherein the polyethylenically unsaturated radiation polymerizable compound contains at least two ethylenically unsaturated groups per molecule.

8. The radiation curable composition of claim 7 wherein the polyethylenically unsaturated radiation polymerizable compound contains 2 to 6 ethylenically unsaturated groups.

9. The radiation curable composition of claim 1 which contains a photoinitiator.

10. The radiation curable composition of claim 9 wherein the photoinitiator is present in the amount of about 0.1 weight percent up to about 10 weight percent based on the total weight of the composition.

11. The radiation curable composition of claim 10 wherein the photoinitiator is present in the amount of about 1 to about 5 weight percent.

* * * * *